Feb. 25, 1958    R. P. SKERRITT    2,824,571
FLOAT VALVE UNIT
Filed Oct. 19, 1955

INVENTOR.
Roy P. Skerritt
BY Barthel + Bugbee
Attys

United States Patent Office 2,824,571
Patented Feb. 25, 1958

2,824,571

FLOAT VALVE UNIT

Roy P. Skerritt, Detroit, Mich.

Application October 19, 1955, Serial No. 541,322

12 Claims. (Cl. 137—426)

This invention relates to humidifiers and, in particular, to float valves for such humidifiers.

One object of this invention is to provide a float valve unit for humidifiers or the like which is adapted to be quickly and easily adjusted, without bending the float arm, in order to raise or lower the level of the water in the container controlled by the float valve.

Another object is to provide a float valve unit having an improved simplified pivot construction which is effective against fogging and other interference with its pivotal function by reason of the formation of lime or other foreign matter thereon.

Another object is to provide a float valve unit wherein the water level adjusting mechanism is so constructed and arranged as to be quickly and easily removable, yet normally urged into a position from which it cannot be accidentally dislodged.

Another object is to provide a float valve unit wherein the pivot or trunnion mechanism is protected from contact with lime-forming water spray by a spray apron attached to the movable valve member which engages the valve seat of the valve nozzle.

Another object is to provide a float valve unit wherein the float arm is attached to the float by an improved connection which is simple and inexpensive, yet extremely effective.

Other objects and advantages of the invention will become apparent during the course of the following description of the accompanying drawings, wherein:

Figure 4 is a fragmentary side elevation of one of the side wings of the float arm pivot bracket of Figure 1, removed from the apparatus;

Figure 7:
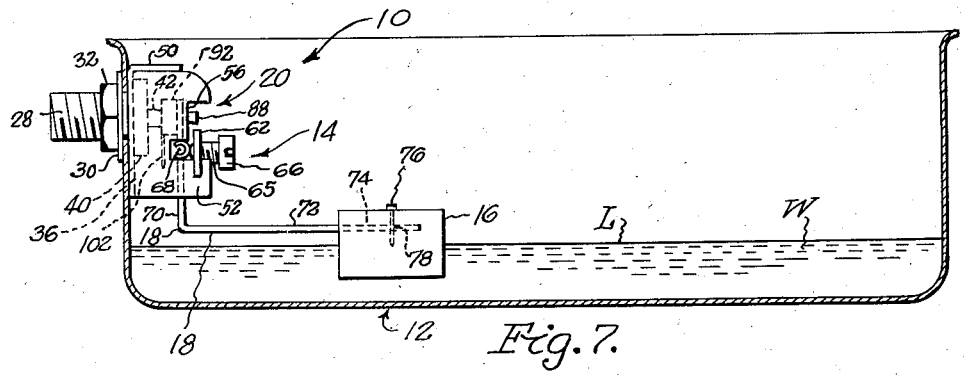
Figure 7 is a side elevation of the float valve unit of the present invention, mounted in a humidifier pan, with the pan shown in longitudinal section.
Figure 3:
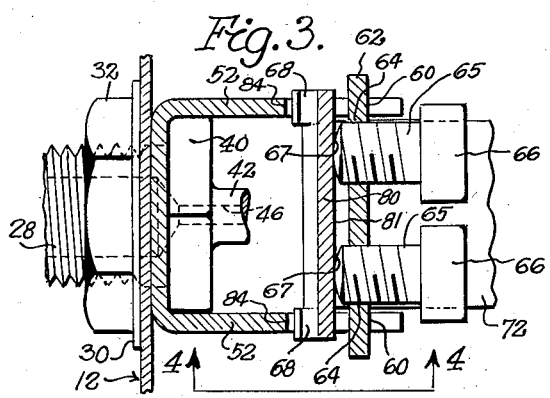
Figure 3 is a stepped horizontal section taken along the stepped line 3—3 in Figure 1.

Referring to the drawing in detail, Figure 7 shows a humidifier, generally designated 10, for heating systems or the like, having a humidifier pan 12 equipped with a float valve unit, generally designated 14, according to one form of the present invention, the float valve in turn consisting of a float 16 mounted on a float arm 18 controlling a valve 20 constructed and arranged according to the present invention. The humidifier pan 12 contains water or other liquid W, the level L of which is controlled by the rise or fall of the float 16 and its action upon the valve 20, when transmitted thereto through the float arm 18.

The valve 20 (Figures 1 to 4 inclusive) consists of a stationary valve member or nozzle, generally designated 22, which is engaged by a movable valve member, generally designated 24, to open or close the valve 20 in order to permit or cut off the flow of water into the humidifier pan 12. The latter in one of its end walls is provided with an aperture 26 through which the threaded stem 28 of the stationary valve member 22 passes and is anchored in place by the washer 30 and nut 32 threaded thereon. The valve stem 28 also passes through a hole 34 in the end wall 36 of an approximately U-shaped bracket, generally designated 38, and is held in position against the annular enlargement or head 40 immediately adjacent the valve stem 38. Projecting forwardly from the enlargement or head 40 is a valve nozzle 42 terminating at its forward end in a valve seat 44 surrounding a passageway 46 which in turn communicates with the bore 48 in the valve stem 28.

The bracket 38, in addition to the end wall 36, is provided with a top wall 50 and bent side walls 52 at right angles thereto (Figures 1 and 2), the two side walls being in spaced parallel relationship with one another. The top wall 50 prevents the water spray from extending upward out of the humidifier pan 12, and the side walls 52 confine it from extending laterally, whereas the movable valve member 24 prevents the water from spraying forwardly from the valve nozzle 48, with the result that it can flow only downwardly into the pan 12. The side walls 52 (Figures 1 and 4) are provided at their forward edges 54 with a pair of aligned rectangular major notches 56 from which a pair of horizontal and vertical rectangular minor notches 58 and 60 respectively extend rearwardly and downwardly.

Seated in the vertical minor notch 60 is a rectangular plate or bar 62 having a pair of horizontally-spaced threaded screw holes 64 into which are threaded the shanks 65 of adjusting screws 66 having rounded ends 67. Seated in the horizontal minor notches 58 are the end pivots or trunnion portions 68 of the vertical part 70 of the float arm 18, the latter having a horizontal part 72 extending along the pan 12 and inserted at its outer end in a recess 74 in the float 16, in which it is secured by a fastener 76 driven downwardly through the float 16 and through a hole 78 in the horizontal part 72 of the float arm 18. The float 16 is made of any suitable buoyant material, such as so-called "foam glass" which is formed by mixing finely divided carbon, such as lamp black, into molten glass, resulting in the production of a myriad of tiny gas-filled bubbles interspersed throughout the entire volume of the float 16.

Figures 5, 6:
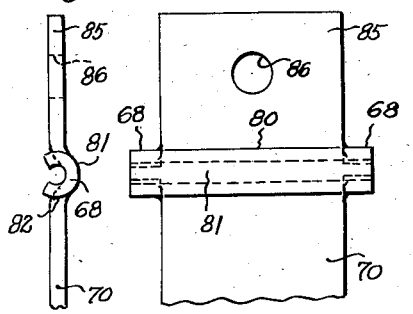
Figure 5 is a fragmentary front elevation of the upper end portion of the float arm, showing the improved trunnion or pivot construction thereof.
Figure 6 is a left-hand side elevation of the upper end portion of the float arm shown in Figure 5.
Figure 1:
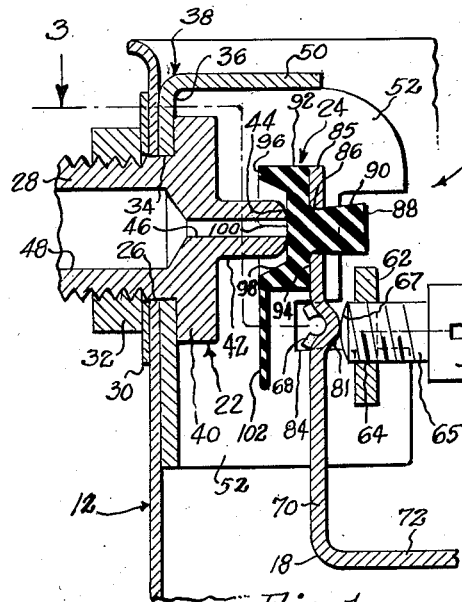
Figure 1 is a central vertical section through the valve of the float valve, according to one form of the present invention, taken along the line 1—1 in Figure 2.

The upper part 72 of the float arm 18, in order to provide the pivots or trunnion portions 68 (Figures 1, 5 and 6) is stamped from sheet metal by suitable dies which indent the normally flat bar stock of the float arm 18 into a transversely-extending semi-cylindrical ridge 80 having a semi-cylindrical outer surface 81. The opposite ends or pivots 68 of the ridge 80 are bent into greater than semi-circular extent (Figure 6) by the action of dies in order to provide cylindrical bearing surfaces 82 thereon of slightly greater than semi-circular extent. These bearing surfaces 82 of the pivot or trunnion portions 68 ride upon the lower edges 84 of the horizontal minor notches 58, the latter of which serve as fulcra for the pivot portions or trunnions 68. From Figure 1 it will be observed that the rounded ends 67 of the screws 66 engage the outer surface 81 of the ridge 80 slightly below the vertex or high point thereof, so that the axis of each screw 66 is disposed slightly below the vertex of the pivot ridge surface 81. This construction has the effect of providing a downward thrust upon the screws 66 and therefore upon the bar 62 so as to hold its opposite ends in the vertical minor notches 60. The bar 62 is prevented from moving sidewise any appreciable distance by the screws 66, which themselves act as stops (Figure 3) adjacent the side walls 52.

The upper end portion 85 of the vertical part 72 of the float arm 18 is provided with a hole 86 of slightly smaller diameter than the stem 88 of the movable valve member 24. The latter is made of elastic deformable material, such as natural or synthetic rubber or synthetic plastic or mixtures thereof, so that the stem 88 can be compressed to insert it into the hole 86, whereupon its end 90 re-expands to prevent withdrawal except by the application of a considerable force. This holds the movable valve member 24 firmly in assembly with the float arm 18.

Figure 2:
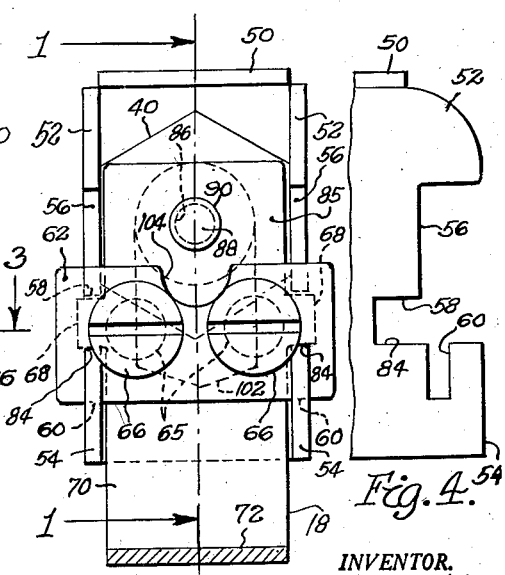
Figure 2 is a right-hand front elevation of the float valve shown in Figure 1, with the float arm in cross-section.

The movable valve member 24, in addition to the reduced diameter stem 88 has a cupped head 92, the annular surface 94 of which surrounding the stem 88 is flat and snugly engages the vertical part 72 of the float arm 18, whereas the forward surface 96 is provided with a recess or cupped depression 98 having a bottom surface 100 which engages the valve seat 44. The latter is preferably rounded for efficient engagement and disengagement purposes. Extending downwardly from and integral with the lower edge of the head 92 adjacent the front surface or rim 96 thereof is a flap or apron 102 which covers and shields the float arm pivot mechanism consisting of the horizontal minor notches 58 and pivots or trunnions 68 so as to prevent water from falling thereon and consequently preventing the deposition of lime as a result of the calcium salts contained in the water upon evaporation thereof by the heat within the heating system. In order to provide adequate clearance for the stem 88 of the movable valve member 44 as it swings outwardly and downwardly away from the valve seat 44, the screw mounting bar 62 is provided with a cutaway portion or notch 104 in the upper edge thereof (Figure 2).

In the operation of the invention, let it be assumed that the humidifier 10 has been mounted in a heating system and that a water pipe is connected by a suitable coupling (not shown) to the threaded stem 28 of the stationary valve member 22. Since there is no water initially in the humidifier pan 12, the float 16 drops downwardly, swinging the upper end portion 85 of the vertical part 72 in a clockwise direction around the pivots or trunnions 68, thereby moving the bottom 100 of the cupped recess 98 of the movable valve member 24 away from the valve seat 44. As a consequence, water spurts outward through the nozzle portion 42 of the stationary valve member 22 in all directions. Water passing upward is deflected downward by the top wall 50 of the bracket 38, whereas water spurting sidewise is similarly affected by the side walls 52 or by the cupped portion 98 of the valve member 92 itself. As a consequence, the water is free to move only downward into the pan 12 where it causes the level L of the water to rise. At the same time, the apron or flap 102 on the movable valve member 24 protects the pivots or trunnions 68 and their bearing notches 58 from contact with this water, thereby preventing the formation of lime which might interfere somewhat with the free action of the pivots 68. The construction of the pivots or trunnions 68 and their large diameter bearing surfaces 82, however, in rolling upon the lower edges 84 of the horizontal minor notches 58 minimizes the detrimental effect of lime or other foreign matter on the pivotal action.

As the water level L rises in the pan 12, it moves the float 16 upward and consequently swings the float arm 18 in a counterclockwise direction around the pivots or trunnions 68, thereby moving the stationary valve member 24 toward the nozzle portion 42 of the stationary valve member 22 and eventually cutting off the flow of water when the bottom 100 of the cupped depression 98 engages the valve seat 44. The water level L then remains constant until the action of hot air upon it evaporates the water W, causing the level L to drop, thereby re-opening the valve 20 in the above-described manner and re-establishing the flow of water.

In order to vary the position of the shut-off point of the water level L within the humidifier pan 12, the operator or service man applies a screw driver to the screws 66, so as to move them inward or outward toward or away from the surface 81 of the ridge 80, thereby altering the position at which the float 16 and float arm 18 will close the movable valve member 24 upon the stationary valve member 22. The reason for this is that the point of contact of the screw ends 67 within the ridge surface 61 is above the points of contact of the pivot surfaces 82 of the pivots or trunnions 68 upon the bearing edges 84 of the horizontal minor notches 58, thereby providing a leverage therebetween which, when measured at the float 16, has a greatly magnified effect.

What I claim is:

1. A humidifier float valve unit comprising a supporting structure, a stationary valve member mounted on said structure, said stationary valve member having a liqiud passageway therethrough and a valve seat at the end of said passageway, a float arm having a pivot rockably mounted on a pivot axis on said structure, a buoyant float mounted on one end of said arm remote from said pivot, a valve closure member mounted on said arm in spaced relationship with said pivot, said closure member being movable into and out of engagement with said valve seat in response to the rise and fall respectively of said float, a cross member secured to said supporting structure transversely to said arm in spaced relationship to said pivot and having a threaded hole therethrough with its axis directed at a location on said arm spaced away from said pivot axis, and an adjustment screw threadedly engaging said hole and contacting said arm substantially at said spaced location.

2. A humidifier float valve unit comprising a supporting structure, a stationary valve member mounted on said structure, said stationary valve member having a liquid passageway therethrough and a valve seat at the end of said passageway, a float arm having a pivot rockably mounted on a pivot axis on said structure, a buoyant float mounted on one end of said arm remote from said pivot, a valve closure member mounted on said arm in spaced relationship with said pivot, said closure member being movable into and out of engagement with said valve seat in response to the rise and fall respectively of said float, said structure having a pair of side walls disposed on opposite sides of said stationary valve member, a cross member secured to said side walls transversely to said arm in spaced relationship to said pivot and having a threaded hole therethrough with its axis directed at a location on said arm spaced away from said pivot axis, and an adjustment screw threadedly engaging said hole and contacting said arm substantially at said spaced location.

3. A humidifier float valve unit comprising a supporting structure, a stationary valve member mounted on said structure, said stationary valve member having a liquid passageway therethrough and a valve seat at the end of said passageway, a float arm having a pivot rockably mounted on a pivot axis on said structure, a buoyant float mounted on one end of said arm remote from said pivot, a valve closure member mounted on said arm in spaced relationship with said pivot, said closure member being movable into and out of engagement with said valve seat in response to the rise and fall respectively of said float, said structure having a pair of side walls disposed on opposite sides of said stationary valve member, said side walls having aligned openings therein, a cross member mounted in said openings of said side walls transversely to said arm in spaced relationship to said pivot and having a threaded hole therethrough with its axis directed at a location on said arm spaced away from said pivot axis, and an adjustment screw threadedly engaging said hole and contacting said arm substantially at said spaced location.

4. A humidifier float valve unit comprising a supporting structure, a stationary valve member mounted on said structure, said stationary valve member having a liquid passageway therethrough and a valve seat at the end of said passageway, a float arm having a pivot rockably mounted on a pivot axis on said structure, a buoyant float mounted on one end of said arm remote from said pivot, a valve closure member mounted on said arm in spaced relationship with said pivot, said closure member being movable into and out of engagement with said valve seat in response to the rise and fall respectively of said float, said structure having a pair of side walls disposed on opposite sides of said stationary valve member and having aligned openings therein, a cross member mounted in said openings transversely to said arm in spaced relationship to said pivot and having a pair of threaded holes therethrough disposed adjacent the inner surfaces of said side walls, and a pair of adjustment screws threaded through said holes into contact with said arm at locations spaced away from said pivot axis.

5. A humidifier float valve unit comprising a supporting structure, a stationary valve member mounted on said structure, said stationary valve member having a liquid passageway therethrough and a valve seat at the end of said passageway, a float arm having a pivot of only partially circular cross-section with one peripheral surface portion thereof rockably mounted on a pivot axis on said structure, a buoyant float mounted on one end of said arm remote from said pivot, a valve closure member mounted on said arm in spaced relationship with said pivot, said closure member being movable into and out of engagement with said valve seat in response to the rise and fall respectively of said float, and an adjustment screw mounted on said structure and adjustably engageable with another peripheral surface portion of said pivot at a location spaced away from said pivot axis and from said one peripheral surface portion.

6. A humidifier float valve unit comprising a supporting structure, a stationary valve member mounted on said structure, said stationary valve member having a liquid passageway therethrough and a valve seat at the end of said passageway, a float arm having a pivot comprising a pair of trunnions projecting outwardly on opposite sides of said arm and integral with said arm, said trunnions being rockably mounted on a pivot axis on said structure, a buoyant float mounted on said arm in spaced relationship with said pivot, said closure member being movable into and out of engagement with said valve seat in response to the rise and fall respectively of said float, and an adjustment device mounted on said structure and adjustably engageable with said float arm at a location spaced away from said pivot axis.

7. A humidifier float valve unit comprising a supporting structure, a stationary valve member mounted on said structure, said stationary valve member having a liquid passageway therethrough and a valve seat at the end of said passageway, a float arm having a pivot of arcuate cross-section with one peripheral surface portion thereof rockably mounted on a pivot axis on said structure, a buoyant float mounted on one end of said arm remote from said pivot, a valve closure member mounted on said arm in spaced relationship with said pivot, said closure member being movable into and out of engagement with said valve seat in response to the rise and fall respectively of said float, a cross member secured to said supporting structure and having a threaded hole therethrough with its axis directed at a location on said arm spaced away from said pivot axis, and an adjustment screw threadedly engaging said hole and contacting another portion of the peripheral surface of said pivot at a location above said pivot axis but below the intersection with said pivot of a radius of said arcuate cross-section drawn parallel to said threaded hole axis.

8. A humidifier float valve unit comprising a supporting structure, a stationary valve member mounted on said structure, said stationary valve member having a liquid passageway therethrough and a valve seat at the end of said passageway, a float arm having a pivot rockably mounted on a pivot axis on said structure, a buoyant float mounted on one end of said arm remote from said pivot, a valve closure member mounted on said arm in spaced relationship with said pivot, said closure member being movable into and out of engagement with said valve seat in response to the rise and fall respectively of said float, and a drip apron secured to and movable with said valve closure member and extending downwardly therefrom past said pivot.

9. A humidifier float valve unit comprising a supporting structure, a stationary valve member mounted on said structure, said stationary valve member having a liquid passageway therethrough and a valve seat at the end of said passageway, a float arm having a pivot rockably mounted on a pivot axis on said structure, a buoyant float mounted on one end of said arm remote from said pivot, a valve closure member mounted on said arm in spaced relationship with said pivot, said closure member being movable into and out of engagement with said valve seat in response to the rise and fall respectively of said float, said valve closure member being of elastic deformable material, and a drip apron also of elastic deformable material integral with and movable with said valve closure member and extending downwardly therefrom past said pivot.

10. A humidifier float valve comprising a supporting structure, a stationary valve member mounted on said structure, said stationary valve member having a liquid passageway therethrough and a valve seat at the end of said passageway, a float arm having a pivot rockably mounted on a pivot axis on said structure, a buoyant float mounted on one end of said arm remote from said pivot, a valve closure member mounted on said arm in spaced relationship with said pivot, said closure member being movable into and out of engagement with said valve seat in response to the rise and fall respectively of said float, said structure having a rear wall and a pair of spaced substantially parallel side walls disposed on opposite sides of said stationary valve member, said side walls having a pair of aligned fulcrum notches therein, said float arm pivot comprising a pair of pivot portions extending outwardly on opposite sides of said arm in pivotal engagement with the edges of said notches.

11. A humidifier float valve comprising a supporting structure, a stationary valve member mounted on said structure, said stationary valve member having a liquid passageway therethrough and a valve seat at the end of said passageway, a float arm having a pivot rockably mounted on a pivot axis on said structure, a buoyant float mounted on one end of said arm remote from said pivot, a valve closure member mounted on said arm in spaced relationship with said pivot, said closure member being movable into and out of engagement with said valve seat in response to the rise and fall respectively of said float, said structure having a rear wall and a pair of spaced substantially parallel side walls disposed on opposite sides of said stationary valve member, said side walls having a pair of aligned fulcrum notches therein, said float arm pivot comprising a pair of pivot portions extending outwardly on opposite sides of said arm in pivotal engagement with the edges of said notches, a cross member secured to said supporting structure transversely to said arm in spaced relationship to said pivot and having a threaded hole therethrough with its axis directed at a location on said arm spaced away from said pivot axis, and an adjustment screw threadedly engaging said hole and contacting said arm substantially at said spaced location.

12. A humidifier float valve unit comprising a supporting structure, a stationary valve member mounted on said structure, said stationary valve member having a liquid passageway therethrough and a valve seat at the end of said passageway, a float arm having a pivot rockably mounted on a pivot axis on said structure, a float of substantially solid cellular buoyant material mounted on one end of said arm remote from said pivot, a valve closure member mounted on said arm in spaced relationship with said pivot, said closure member being movable into and out of engagement with said valve seat in response to the rise and fall respectively of said float, said float having a recess therein, said float arm being seated in said recess and having a hole therethrough, and a fastener disposed in said float transversely to said float arm and passing through said hole.

References Cited in the file of this patent
UNITED STATES PATENTS

| | | |
|---|---|---|
| 121,010 | Seyter | Nov. 14, 1871 |
| 954,040 | Morrison | Apr. 5, 1910 |
| 1,457,314 | Mueller | June 5, 1923 |
| 1,482,505 | Bergner | Feb. 5, 1924 |
| 2,292,407 | Skerritt | Aug. 11, 1942 |